United States Patent
Cantwell

(10) Patent No.: US 7,103,787 B2
(45) Date of Patent: Sep. 5, 2006

(54) METHOD FOR DISCOVERING POWER CONSUMPTION IN HARDCOPY OUTPUT DEVICE BY ADDING IDLE POWER CONSUMPTION TO OUTPUTTING POWER CONSUMPTION OF HARDCOPY OUTPUT DEVICE

(75) Inventor: Charles Eric Cantwell, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 529 days.

(21) Appl. No.: 10/353,511

(22) Filed: Jan. 29, 2003

(65) Prior Publication Data
US 2004/0148529 A1  Jul. 29, 2004

(51) Int. Cl.
*G06F 1/26* (2006.01)
(52) U.S. Cl. .................... 713/320; 713/300
(58) Field of Classification Search ................ 713/300, 713/320
See application file for complete search history.

(56) References Cited

U.S. PATENT DOCUMENTS

| | | | |
|---|---|---|---|
| 6,029,238 A * | 2/2000 | Furukawa | 712/1 |
| 6,724,493 B1 * | 4/2004 | Maruta et al. | 358/1.14 |
| 6,795,829 B1 * | 9/2004 | Alsop et al. | 707/102 |
| 6,918,645 B1 * | 7/2005 | Takahashi | 347/16 |
| 6,928,564 B1 * | 8/2005 | Tada et al. | 713/321 |
| 2002/0152184 A1 * | 10/2002 | Katsuda | 705/400 |

FOREIGN PATENT DOCUMENTS

JP  10-341536  * 12/1998

* cited by examiner

*Primary Examiner*—Chun Cao

(57) ABSTRACT

The power consumption of a hardcopy output device is discovered. A page count value is gathered from the hardcopy output device. The page count value represents a number of hardcopy pages output by the hardcopy output device. The page count value is multiplied by a page power consumption value to approximate the outputting power consumption of the hardcopy output device.

18 Claims, 3 Drawing Sheets

METHOD FOR DISCOVERING POWER CONSUMPTION IN HARDCOPY OUTPUT DEVICE BY ADDING IDLE POWER CONSUMPTION TO OUTPUTTING POWER CONSUMPTION OF HARDCOPY OUTPUT DEVICE

BACKGROUND OF THE INVENTION

This invention relates in general to power consumption in a hard copy output device and, more particularly, to discovering the power consumption of a hardcopy output device. Examples of hardcopy output devices include a printer, a plotter, a facsimile machine, a copier, and a multifunction device.

SUMMARY OF THE INVENTION

According to principles of the present invention, in one embodiment, the power consumption of a hardcopy output device is discovered. A page count value is gathered from the hardcopy output device. The page count value represents the number of hardcopy pages output by the hardcopy output device. The page count value is multiplied by a page power consumption value to approximate the outputting power consumption of the hardcopy output device.

DETAILED DESCRIPTION OF THE INVENTION

Figure 1:
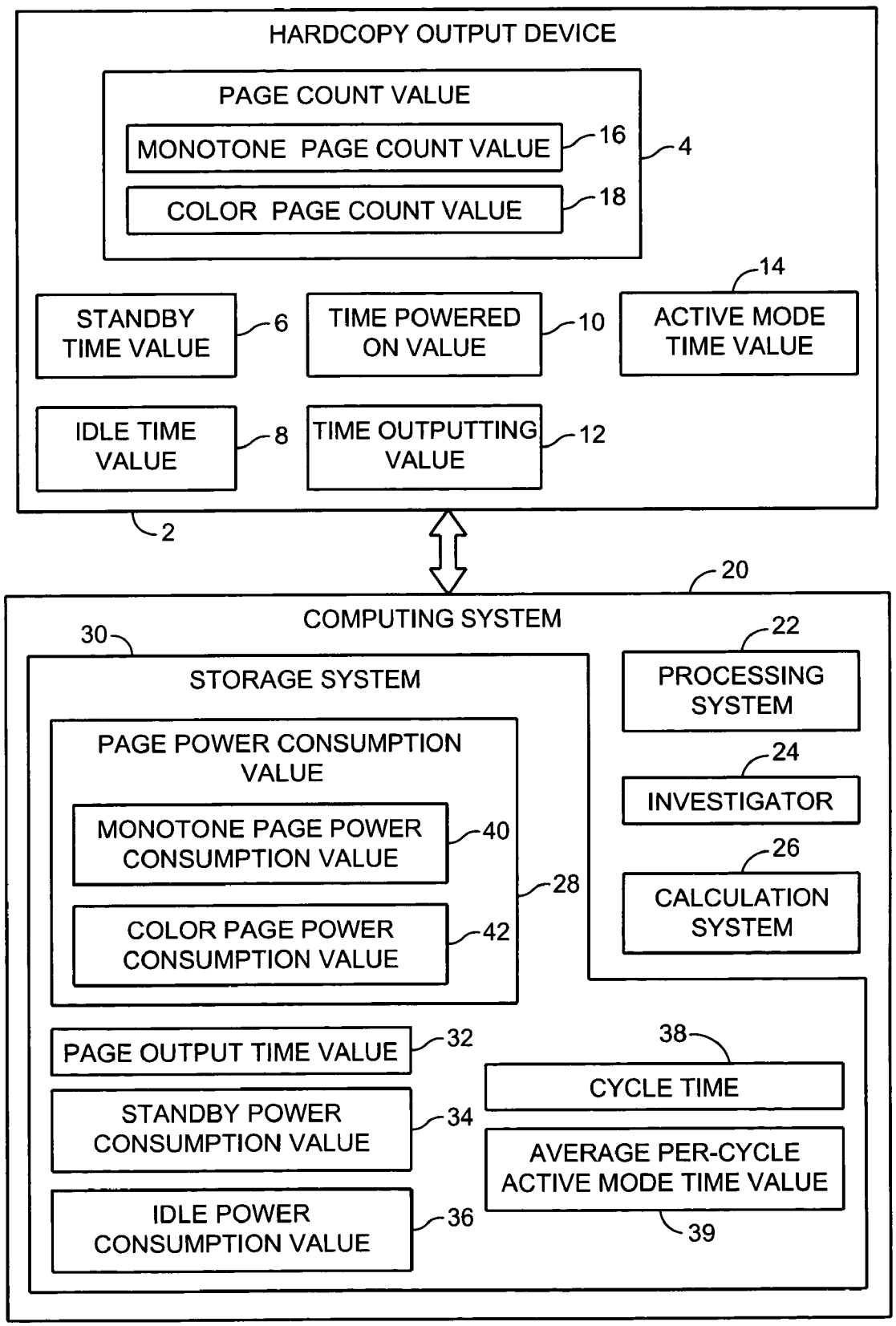
FIG. 1 is a block diagram illustrating one embodiment of the present invention system for discovering power consumption of a hardcopy output device.

Illustrated in FIG. 1 is one embodiment of the present invention system for discovering power consumption of a hardcopy output device 2. Hardcopy output device 2 is any apparatus or system for generating a hardcopy output. Examples of hardcopy output device 2 include a printer, a plotter, a facsimile machine, a copier, and a multifunction device. In one embodiment, hardcopy output device 2 maintains the following values: a page count value 4, a standby time value 6, an idle time value 8, a time powered on value 10, a time outputting value 12, and an active mode time value 14.

In one embodiment, hardcopy output device 2 has an active mode and a standby mode. The standby mode is a low power consumption mode allowing hardcopy output device to remain on, but use less power than in the active mode. "Active mode" refers to any operational mode that is not the standby mode. Typically, the hardcopy device 2 will consume more power while operating in an Active mode as compared to the standby mode.

Page count value 4 is the number of hardcopy pages output by hardcopy output device 2. Duplexed pages, pages with printing on both sides, count as two pages towards page count value 4. Page count value 4 may be reset at certain times or may be a cumulative value that indicates the total number of all pages outputted by hardcopy output device 2. Examples of times page count value 4 may be reset include each time the value is read or periodically.

In the present implementation, the hardcopy output device 2 can selectively print pages in a monotone mode and in a color mode. Page count value 4 is separated into a monotone page count value 16 and a color page count value 18. Monotone page count value 16 is the total number of monotone pages output by hardcopy output device 2. Color page count value 18 is the total number of color pages output by hardcopy output device 2.

Standby time value 6 is the amount of time hardcopy output device 2 is operating in the standby mode. Standby time value 6 is in any units, for example days, hours, minutes, and seconds. Standby time value 6 is either reset at times or cumulative of all standby time of hardcopy output device 2.

Idle time value 8 is the amount of time hardcopy output device 2 is in active mode but not outputting. Idle time value 8 is in any units. Idle time value 8 is either reset at times or cumulative of all idle time of hardcopy output device 2.

Time powered on value 10 is the amount of time hardcopy output device 2 is powered on, either in active or standby mode. Time powered on value 10 is in any units. Time powered on value 10 is either reset at times or cumulative of all time powered on of hardcopy output device 2.

Time outputting value 12 is the amount of time hardcopy output device 2 is outputting hardcopy. For example, where hardcopy output device 2 is a printer, time outputting value 12 is the amount of time spent transporting pages through the printer. Time outputting value 12 is in any units. Time outputting value 12 is either reset at times or cumulative of all time outputting of hardcopy output device 2.

Active mode time value 14 is the amount of time hardcopy output device 2 is in active mode. Idle time and outputting time both occur in active mode. Standby time does not occur in active mode. Active mode time value 14 is in any units. Active mode time value 14 is either reset at times or cumulative of all active mode time at hardcopy output device 2.

Hardcopy output device 2 communicates with computing system 20. Computing system 20 is any apparatus or system for executing executable code and processing information or data. In one embodiment, computing system 20 includes a processing system 22, investigator 24, calculation system 26, page power consumption value 28, and optionally, storage system 30, page output time value 32, standby power consumption value 34, idle power consumption value 36, cycle time 38, and average per-cycle active mode time value 39. Processing system 22 is any device or system configured to process executable code.

Investigator 24 includes any combination of executable code and hardware configured to gather information or data. Calculation system 26 includes any combination of executable code and hardware configured to perform mathematical operations on numerical values.

Page power consumption value 28 reflects the estimated power consumed by hardcopy output device 2 while outputting a hardcopy page. Page power consumption value 28 is optionally separated into monotone page power consumption value 40 and color page power consumption value 42. Monotone page power consumption value 40 reflects the estimated power consumed by hardcopy output device 2 while outputting a monotone hardcopy page. Color page power consumption value 42 reflects the estimated power consumed by hardcopy output device 2 while outputting a color hardcopy page.

Storage system 30 is any device or system configured to store data or executable code. In one embodiment, page power consumption 28, page output time 32, standby power consumption value 34, idle power consumption value 36, cycle time 38, and average per-cycle active mode time value 39 are stored in storage system 30.

Figure 2:
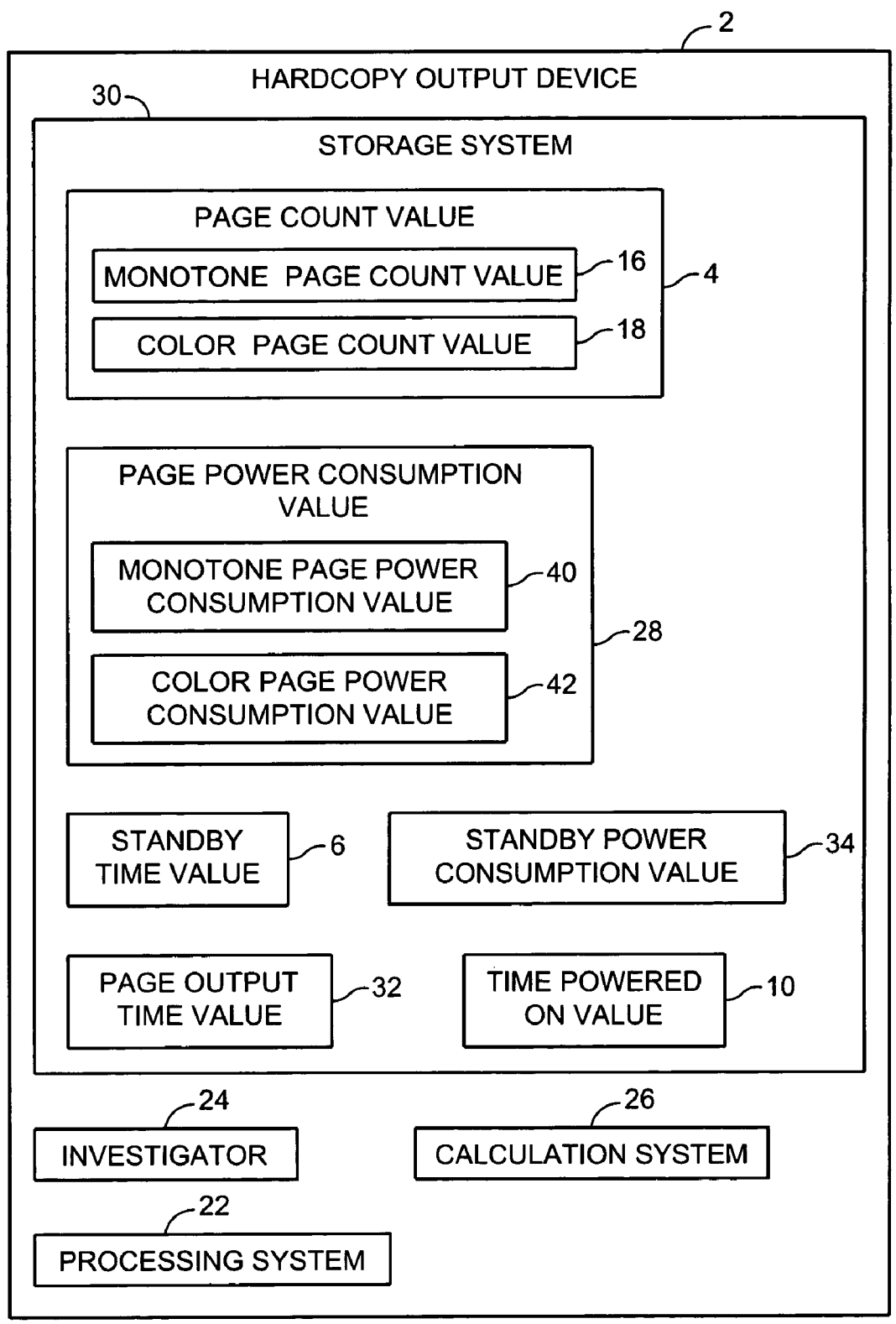
FIG. 2 is a block diagram illustrating an alternate embodiment of the present invention system for discovering power consumption of a hardcopy output device.

Storage system 30 may also be a program storage system tangibly embodying a program, applet, or instructions executable by processing system 22 for performing the method steps of the present invention executable by a processing system 22. Storage system 30 may be any type of storage media such as magnetic, optical, or electronic storage media. Storage system 30 is illustrated in FIGS. 1 and 2 as a single device. Alternatively, storage system 30 may include more than one device. Furthermore, each device of storage system 30 may be embodied in a different media type. For example, one device of storage system 30 may be a magnetic storage media while another device of storage system 30 is an electronic storage media.

Page output time value 32 reflects the estimated time it takes to transport one hardcopy page through hardcopy output device 2. Standby power consumption value 34 reflects the estimated amount of power consumed by hardcopy output device 2 while it is in standby mode. Idle power consumption value 36 reflects the amount of power consumed by hardcopy output device 2 while in an active mode, but not outputting.

Cycle time 38 reflects the length of a cycle in hardcopy output device 2. A cycle is the time between instances of hardcopy output device 2 periodically entering standby mode where hardcopy output device 2 enters standby mode on a periodic scheduled basis. For example, if hardcopy output device 2 periodically entered standby mode each day at midnight, the cycle time is the time from midnight to midnight, or 24 hours. Average per cycle active mode time value 39 represents an average amount of time that hardcopy output device 2 is in active mode for each cycle. Where hardcopy output device 2 does not enter standby mode on a periodic scheduled basis, there is no cycle time 38.

Illustrated in FIG. 2 is an alternate embodiment of the present invention system for discovering power consumption of a hardcopy output device 2. Hardcopy output device 2 includes those devices and systems from FIG. 1 that were incorporated in computer system 20.

Figure 3:
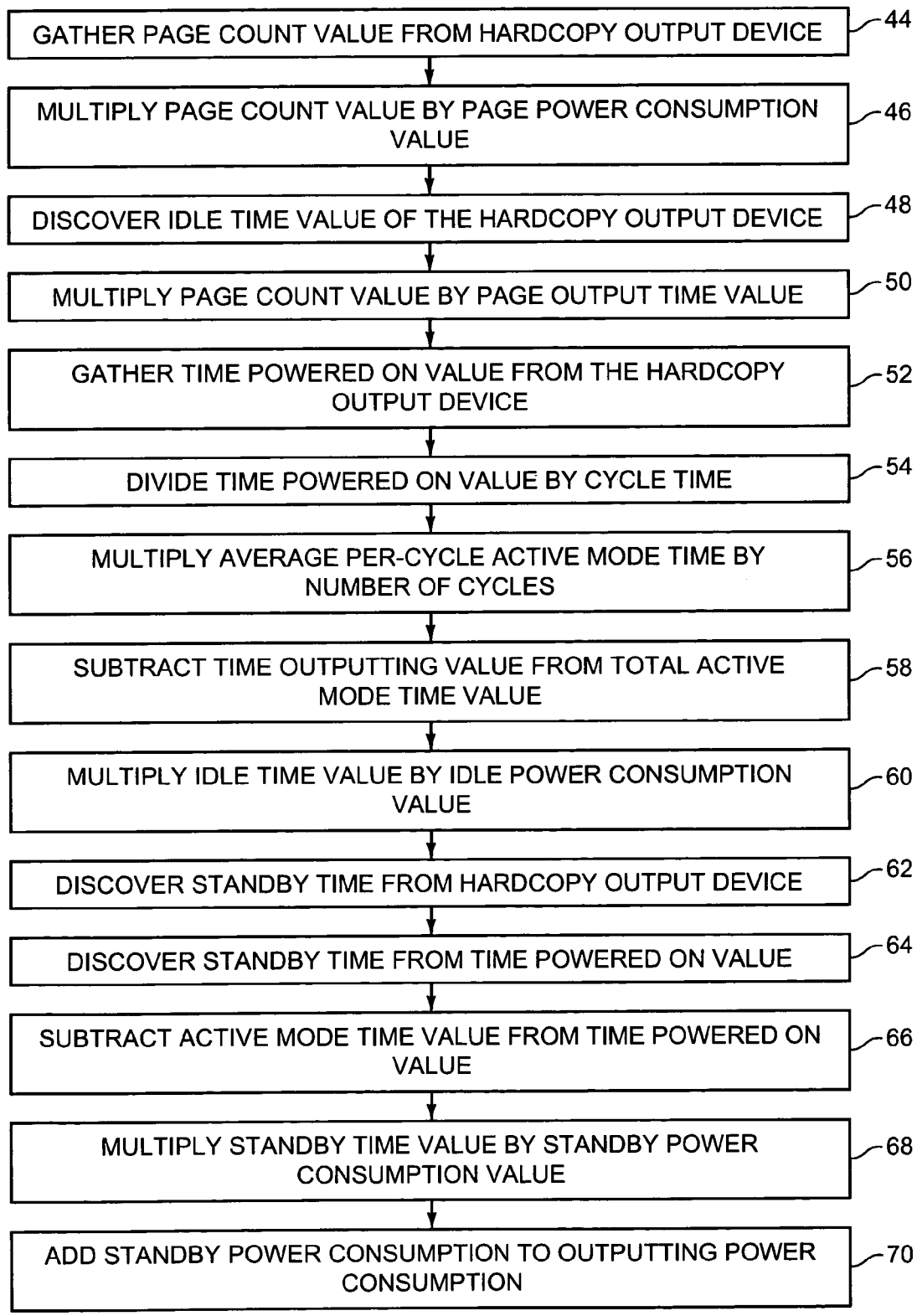
FIG. 3 is a flow chart illustrating one embodiment of the present invention method for discovering power consumption of a hardcopy output device.

FIG. 3 is a flow chart representing steps of one embodiment of the present invention. Although the steps represented in FIG. 3 are presented in a specific order, the present invention encompasses variations in the order of steps. Furthermore, additional steps may be executed between the steps illustrated in FIG. 3 without departing from the scope of the present invention.

Page count value 4 is gathered (step 44) from hardcopy output device 2. Page count value 4 is either monotone page count value 16, color page count value 18, or a sum of both monotone page count value 16 and color page count value 18.

In one embodiment, gathering (step 44) page count value 4 includes querying hardcopy output device 2 for page count value 4. In an alternative embodiment, gathering (step 44) page count value 4 includes triggering hardcopy output device 2 to emit a hardcopy page displaying page count value 4 and inputting page count value 4.

Page count value 4 is multiplied (step 46) by page power consumption value 28 to estimate the outputting power consumption of hardcopy output device 2. Page power consumption value 28 is either monotone page power consumption value 40, color page power consumption value 42, or a combination of both monotone page power consumption value 40 and color page power consumption value 42.

Idle time value 8 of hardcopy output device 2 is discovered (step 48). In one embodiment, idle time value 8 is discovered (step 48) by gathering it from hardcopy output device 2.

In an alternate embodiment, idle time value 8 is discovered (step 48) using page count value 4, page output time value 32, time powered on value 10, and a total active mode time. Page count value 4 is multiplied (step 50) by page output time value 32 to approximate a time outputting value. Time powered on value 10 is gathered (step 52) from hardcopy output device 2. Time powered on value 10 is divided (step 54) by cycle time 38 to obtain a number of cycles.

Average per-cycle active mode time 39 is multiplied (step 56) by the number of cycles to obtain a total active mode time value. Alternatively, total active mode time value is obtained by gathering active mode time value 14 from hardcopy output device 2. Time outputting value 12 is subtracted (step 58) from the total active mode time value to ascertain the idle time value. The idle time value is multiplied (step 60) by idle power consumption value 36 to approximate an idle power consumption. The idle power consumption is added to the outputting power consumption to approximate the total power consumption.

Where the standby power consumption of hardcopy output device 2 is significantly less than the outputting power consumption of hardcopy output device 2, it may be desirable to ignore the standby power consumption. The calculation of standby power consumption adds complexity to the determination of the total power consumed and if the difference is insignificant, a less complex calculation may be desired. Otherwise, it is desirable to continue further to find the total power consumption, including the standby power consumption.

Standby time value 6 of hardcopy output device 2 is discovered (step 62). In one embodiment stand by time value 6 is discovered (step 62) by gathering it from hardcopy output device 2.

In an alternate embodiment, standby time value 6 is discovered (step 62) by gathering (step 64) time powered on value 10. Active mode time value 14 is subtracted (step 66) from time powered on value 10 to obtain standby time value 6.

Standby time value 6 is multiplied (step 68) by standby power consumption value 34 to approximate a standby power consumption of hardcopy output device 2. The standby power consumption of hardcopy output device 2 is added (step 70) to the outputting power consumption of hardcopy output device 2 to approximate the total power consumption of hardcopy output device 2.

The foregoing description is only illustrative of the invention. Various alternatives and modifications can be devised by those skilled in the art without departing from the invention. Accordingly, the present invention embraces all such alternatives, modifications, and variances that fall within the scope of the appended claims.

What is claimed is:

1. A method for discovering power consumption of a hardcopy output device, the method comprising:

gathering a page count value from the hardcopy output device;

multiplying the page count value by a page power consumption value to estimate the outputting power consumption of the hardcopy output device;

discovering an idle time value of the hardcopy output device, the idle time value representative of a time the hardcopy output device is in active mode, but not outputting;

multiplying the idle time value by an idle power consumption value to approximate an idle power consumption of the hardcopy output device; and adding the idle power consumption of the hardcopy output device to the outputting power consumption of the hardcopy output device to approximate the power consumption of the hardcopy output device.

2. The method of claim 1 wherein discovering the idle time value includes:

multiplying the page count value by a page output time value to approximate a time outputting value;

obtaining a total active mode time value; and subtracting the time outputting value from the total active mode time value to ascertain the idle time value.

3. The method of claim 2 wherein obtaining the total active mode time value includes:

gathering a time powered on value from the hardcopy output device;

dividing the time powered on value by a cycle time of the output device to obtain a number of cycles; and multiplying an average active mode time value by the number of cycles to obtain a total active mode time value.

4. A method far discovering power consumption of a hardcopy output device, the method comprising:

gathering a page count value from the hardcopy output device;

multiplying the page count value by a page power consumption value to estimate the outputting power consumption of the hardcopy output device;

discovering a standby time value of the hardcopy output device, the standby time value representative of a time the hardcopy output device is in standby mode;

multiplying the standby time value by a standby power consumption value to approximate a standby power consumption of the hardcopy output device; and adding the standby power consumption of the hardcopy output device to the outputting power consumption of the hardcopy output device to approximate the power consumption of the hardcopy output device.

5. The method of claim 4 wherein discovering the standby time value includes:

gathering a time powered on value from the hardcopy output device;

obtaining a total active mode time value; and subtracting the total active mode time value from the lime powered on value to ascertain the standby time value.

6. The method of claim 5 wherein obtaining the total active mode time value includes:

dividing the time powered on value by a cycle time of the output device to obtain a number of cycles and multiplying an average active mode time value by the number of cycles to obtain a total active mode time value.

7. A system for discovering power consumption of a hardcopy output device, the system comprising:

a hardcopy output device having a page count value representative of a number of hardcopy pages output by the hardcopy output device;

an investigator configured to gather the page count value from the hardcopy output device and to discover an idle time value of the hardcopy output device, the idle time value representative of a time the hardcopy output device is in active mode, but not outputting;

a storage system having a page power consumption value and an idle power consumption value; and a calculation system configured to use the page count value and the page power consumption value to approximate an outputting power consumption of the hardcopy output device and to use the idle time value, the idle power consumption value, and the outputting power consumption of the hardcopy output device to approximate the power consumption of the hardcopy output device.

8. The system of claim 7 wherein:

the investigator is further configured to obtain a total active mode time value;

the storage system further includes a page output time value; and the calculation system is further configured to;

use the page count value and the page output time value to approximate a time outputting value; and use the time outputting value from the total active mode time value to ascertain the idle time value.

9. The system of claim 8 wherein:

the investigator is further configured to gather a time powered on value from the hardcopy output device;

the storage system further includes a cycle time of the output device and an average active mode time value; and the calculation system is further configured to:

use the time powered on value and the cycle time of the output device to obtain a number of cycles and use the average active mode time value and the number of cycles to obtain a total active mode time value.

10. A system for discovering power consumption of a hardcopy output device, the system comprising:

a hardcopy output device having a page count value representative of a number of hardcopy pages output by the hardcopy output device;

an investigator configured to gather the page count value from the hardcopy output device and to discover a standby time value of the hardcopy output device, the standby time value representative of a time the hardcopy output device is in standby mode;

a storage system having a page power consumption value and a standby power consumption value; and a calculation system configured to use the page count value and the page power consumption value to approximate an outputting power consumption of the hardcopy output device and to;

use the standby time value and the standby power consumption value to approximate a standby power consumption of the hardcopy output device and use the standby power consumption of the hardcopy output device and the outputting power consumption of the hardcopy output device to approximate the power consumption of the hardcopy output device.

11. The system of claim 10 wherein:

the investigator is further configured to gather a time powered on value from the hardcopy output device and to obtain a total active mode time value and the calculation system is further configured to use the total active mode time value and the time powered on value to ascertain the standby time value.

12. The system of claim 11 wherein:

the storage system further includes a cycle time of the output device and an average active mode time value and the calculation system is further configured to:
use the time powered on value and the cycle time of the output device to obtain a number of cycles and
use the average active mode time value and the number of cycles to obtain a total active mode time value.

13. A program storage system readable by a computer, tangibly embodying a program, applet, or instructions executable by the computer to perform method steps for discovering power consumption of a hardcopy output device, the method steps comprising:
gathering a page count value from the hardcopy output device and
using the page count value and a page power consumption value to approximate an outputting power consumption of the hardcopy output device;
discovering an idle time value of the hardcopy output device, the idle time value representative of a time the hardcopy output device is in active mode, but not outputting;
using the idle time value end an idle power consumption value to approximate an idle power consumption of the hardcopy output device; and
using the idle power consumption at the hardcopy output device and the outputting power consumption of the hardcopy output device to approximate the power consumption of the hardcopy output device.

14. The program storage system of claim 13 wherein the method step of discovering the idle time value includes:
using the page count value and a page output time value to approximate a time outputting value;
obtaining a total active mode time value; and
using the time outputting value and the total active mode time value to ascertain the idle time value.

15. The program storage system of claim 14 wherein the method step of obtaining the total active mode time value includes:
gathering a time powered on value from the hardcopy output device;
using the time powered on value and a cycle time of the output device to obtain a number of cycles; and
using an average active mode time value and the number of cycles to obtain a total active made time value.

16. A program storage system readable by a computer, tangibly embodying a program, applet, or instructions executable by the computer to perform method steps for discovering power consumption of a hardcopy output device, the method steps comprising:
gathering a page count value from the hardcopy output device and
using the page count value and a page power consumption value to approximate an outputting power consumption of the hardcopy output device;
discovering a standby time value of the hardcopy output device, the standby time value representative of a time the hardcopy output device is in standby mode;
using the standby time value and a standby power consumption value to approximate a standby power consumption of the hardcopy output device; and
using the standby power consumption of the hardcopy output device and the outputting power consumption of me hardcopy output device to approximate the power consumption of the hardcopy output device.

17. The program storage system of claim 16 wherein the method step of discovering the standby time value includes:
gathering a time powered on value from the hardcopy output device;
obtaining a total active mode time value; and
using the total active mode time value and the time powered on value to ascertain the standby time value.

18. The program storage system of claim 17 wherein the method step of obtaining the total active mode time value includes:
using the time powered on value and a cycle time of the output device to obtain a number of cycles and
using an average active mode time value and the number of cycles to obtain a total active mode time value.

* * * * *

UNITED STATES PATENT AND TRADEMARK OFFICE
CERTIFICATE OF CORRECTION

PATENT NO. : 7,103,787 B2  
APPLICATION NO. : 10/353511  
DATED : September 5, 2006  
INVENTOR(S) : Charles Eric Cantwell It is certified that error appears in the above-identified patent and that said Letters Patent is hereby corrected as shown below:

On the Title page, item (75), in "Inventor", in column 1, line 1, delete "Boise" and insert -- Eagle --, therefor.

In column 5, line 28, in Claim 4, delete "far" and insert -- for --, therefor.

In column 5, line 51, in Claim 5, delete "lime" and insert -- time --, therefor.

In column 6, line 18, in Claim 8, delete "to;" and insert -- to: --, therefor.

In column 6, line 49, in Claim 10, delete "to;" and insert -- to: --, therefor.

In column 7, line 20, in Claim 13, delete "end" and insert -- and --, therefor.

In column 7, line 23, in Claim 13, delete "at" and insert -- of --, therefor.

In column 8, line 2, in Claim 15, delete "made" and insert -- mode --, therefor.

In column 8, line 22, in Claim 16, delete "me" and insert -- the --, therefor.

Signed and Sealed this

Twentieth Day of January, 2009

JON W. DUDAS  
*Director of the United States Patent and Trademark Office*